No. 656,451.　　　　　　　　　　　　　Patented Aug. 21, 1900.
L. FLEISCHMANN.
AUTOMATIC CIRCUIT INTERRUPTER.
(Application filed July 12, 1899.)
(No Model.)
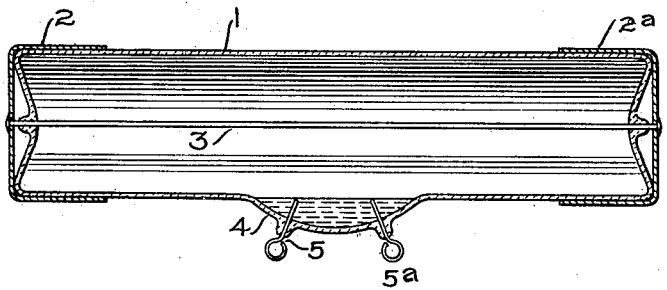
Witnesses.
Arthur H. Abell.
A. F. Macdonald.
Inventor.
Lionel Fleischmann,
by Albert G. Davis
Atty.

UNITED STATES PATENT OFFICE.

LIONEL FLEISCHMANN, OF SCHENECTADY, NEW YORK, ASSIGNOR TO THE GENERAL ELECTRIC COMPANY, OF NEW YORK.

AUTOMATIC CIRCUIT-INTERRUPTER.

SPECIFICATION forming part of Letters Patent No. 656,451, dated August 21, 1900.

Application filed July 12, 1899. Serial No. 723,536. (No model.)

*To all whom it may concern:*

Be it known that I, LIONEL FLEISCHMANN, a citizen of the United States, residing at Schenectady, county of Schenectady, State of New York, have invented certain new and useful Improvements in Automatic Circuit-Interrupters, (Case No. 1,201,) of which the following is a specification.

This invention relates to automatic circuit-interrupters responsive to overload conditions of an electric circuit.

The invention is especially applicable to fuses.

In carrying out the invention I inclose air-tight in an envelop or tube a body of combustible or explosive gas or gaseous mixture and a conductor capable of being heated or fused by current of abnormal strength in the circuit for which the device is designed. The terminals or circuit connections with the conductor are led through the walls of the tube. The gaseous mixture I prefer to employ is one composed of oxygen and hydrogen in such proportions as will be capable of uniting to form water when sufficient heat is furnished to promote the union. In the best form of my invention I employ a glass tube or envelop having thin walls, the ends of which are provided with metallic caps to promote easy inclusion in an electric circuit, the fuse-wire or cut-out controlling device being led through an all-glass seal in the ends of the tube, a pair of auxiliary terminals being sealed into the glass in a small capsule or enlargement, which is initially charged with a small quantity of water or acidulated solution of water. By means of these terminals the water may be decomposed by an initial application of a direct current into oxygen and hydrogen, which of course will produce the gases in definite proportions capable of recombining when a directive influence supplies the necessary heat. An organization of this kind is included in an electric circuit, and when an abnormal current flows the fuse melts and the arc formed determines the union of the gases with explosive violence, rupturing the inclosure or envelop and blowing out the arc.

My invention therefore comprises an automatic cut-out consisting of a gas-tight inclosure containing an explosive gaseous body and having a thin conductor or fuse extending therethrough.

It comprises other features of novelty, which will be hereinafter more fully described, and definitely indicated in the claims appended to the specification.

In the drawing which illustrates my invention, 1 represents an envelop, preferably formed of glass, which admits of all the parts being inspected and from its brittleness forms a good medium to respond to the explosive pressure of the gases. At the ends of the tube are provided metal thimbles or caps 2 $2^a$, which may be shrunk or cemented fast. Electrically connected with these terminal thimbles is a conductor or fuse 3, extending through the tube and sealed air-tight in its ends. It is better to provide an all-glass seal, for which purpose it will be advisable to employ at the points where the conductor leads through the glass a metal whose ratio of expansion is substantially the same as that of glass. Platinum will best serve this purpose, though its employment would be forbidden on the ground of cost. Iron, copper, or other suitable metal may be employed. The fuse itself is formed of some readily-fusible material, such as is commonly employed for fuses and which is well known in the art. The invention, however, is not restricted to an application in which the conductor is fused under the influence of abnormal current, but may also be employed in connection with such gases as may be fired by a red or white heat and the rupture of the envelop be relied upon to produce a change in the circuit.

In a suitable portion of the tube is blown a small bulb or cavity (indicated at 4) designed to receive a few drops of water or a dilute solution of sulfuric acid or other electrolyte. Into the walls of the chamber at its enlargement are sealed two terminals 5 $5^a$, by which an electrolytic action upon the liquid may be set up by suitable connection with an external source of current. The apparatus as thus constituted is especially designed for employment with such gases as result from electrolytic decomposition. For example, if acidulated water be placed in the enlargement and it be electrolytically decomposed oxygen and hydrogen will be set free and will be diffused through the air in the chamber. The gases will not, however, recombine until a determined cause be furnished. The electric arc or spark acts perfectly for this purpose, and when the fuse is overloaded the gases are touched off and recombine with explosive violence, rupturing the walls of the envelop and expulsively extinguishing the arc.

It is not absolutely essential that an all-glass seal be provided for the conductors where they pass into the envelop, the only prerequisite being that the gases shall be kept from diffusing into the atmosphere outside the envelop. Obviously, therefore, under some conditions an ordinarily air-tight joint will be sufficient.

What I claim as new, and desire to secure by Letters Patent of the United States, is—

1. An automatic cut-out, comprising a gas-tight inclosure containing an explosive gaseous body and a thin conductor within the inclosure, and terminals connected with the conductor extending outside of the inclosure.

2. An automatic cut-out comprising a gas-tight inclosure containing an explosive gaseous body, a fuse within the inclosure, and terminals extending through the walls of the inclosure to permit inclusion of the fuse within an electric circuit.

3. An automatic cut-out comprising a gas-tight inclosure containing a combustible gaseous body, and a fuse extending through the inclosure having terminals extending air-tight through its walls.

4. An automatic cut-out comprising a gas-tight inclosure containing two gases capable of chemical combination under heat, and a thin conductor having terminals extending gas-tight outside of the inclosure.

5. An automatic cut-out comprising a gas-tight inclosure containing two gases capable of chemical combination under heat, and a fuse within the inclosure and having terminals extending gas-tight through its walls.

6. An automatic cut-out comprising a gas-tight inclosure, a fuse within the inclosure having terminals extending gas-tight through its walls, a liquid-receptacle within the inclosure, a liquid within the same and two conductors extending from without into said receptacle, as and for the purpose described.

7. An automatic cut-out comprising a gas-tight inclosure, a fuse within the inclosure having terminals extending gas-tight through its walls, a liquid-receptacle within the inclosure, two conductors extending from without into said receptacle, and an electrolyte decomposable into gases within said receptacle.

8. An automatic cut-out comprising a gas-tight inclosure, a fuse within the inclosure having terminals extending gas-tight through its walls, a liquid-receptacle within the inclosure, two conductors extending from without into said receptacle, and an electrolyte decomposable into oxygen and hydrogen within said receptacle.

9. An automatic cut-out comprising a glass inclosure containing a fuse having terminals extending outside of the inclosure and sealed into its walls, said inclosure containing an explosive gaseous body.

10. An automatic cut-out comprising a glass tube, metallic caps at the ends of the tube, a fuse within the tube having terminals sealed into its end walls, and an explosive gas within the tube.

In witness whereof I have hereunto set my hand this 10th day of July, 1899.

LIONEL FLEISCHMANN.

Witnesses:
BENJAMIN B. HULL,
MABEL E. JACOBSON.